(12) United States Patent
Turøy

(10) Patent No.: US 11,161,185 B2
(45) Date of Patent: Nov. 2, 2021

(54) HOLE SAW ADAPTOR

(71) Applicant: Aron Andreas Turøy, Laksevåg (NO)

(72) Inventor: Aron Andreas Turøy, Laksevåg (NO)

( * ) Notice: Subject to any disclaimer, the term of this patent is extended or adjusted under 35 U.S.C. 154(b) by 0 days.

(21) Appl. No.: 16/767,030

(22) PCT Filed: Nov. 27, 2018

(86) PCT No.: PCT/NO2018/050294
§ 371 (c)(1),
(2) Date: May 26, 2020

(87) PCT Pub. No.: WO2019/103623
PCT Pub. Date: May 31, 2019

(65) Prior Publication Data
US 2020/0391307 A1 Dec. 17, 2020

(30) Foreign Application Priority Data
Nov. 27, 2017 (NO) .................................... 20171891

(51) Int. Cl.
*B23B 51/04* (2006.01)
*B23B 51/12* (2006.01)
(52) U.S. Cl.
CPC ...... *B23B 51/0453* (2013.01); *B23B 51/0473* (2013.01); *B23B 51/12* (2013.01); *Y10T 408/51* (2015.01)
(58) Field of Classification Search
CPC .. B23B 51/0453; B23B 51/0473; B23B 51/12
See application file for complete search history.

(56) References Cited

U.S. PATENT DOCUMENTS

| 325,362 A | 9/1885 | Rowbotham |
| 1,705,049 A * | 3/1929 | Fournier ............. B23B 51/0453 408/68 |

(Continued)

FOREIGN PATENT DOCUMENTS

| EP | 2236230 A2 | 10/2010 |
| EP | 3181275 A1 | 6/2017 |

(Continued)

*Primary Examiner* — Eric A. Gates
(74) *Attorney, Agent, or Firm* — Flener IP & Business Law; Zareefa B. Flener

(57) ABSTRACT

Hole saw adapter (10) comprised of an adapter body (12) with a first end equipped with a spindle (14) for fastening to a drive unit, such as a drilling machine, and a second end to receive a hole saw (32) and a central drill (34), in which the adapter body (12) is extended and equipped with a longitudinally running axial groove (16) where the longitudinally running axial groove (16) is at least partially formed as a cross-wise through-running open slit in the adapter body (12). The central drill (34) is fasten to the inner axially displaceable holding part (22) so that it can be made loose, said inner axially displaceable holding part (22) can be displaced in the longitudinally running axial groove (16) in the adapter body (12) and is fastened to an external displacement part (18), as the external displacement part (18) surrounds the adapter body (12) and is set up for a forced axial displacement of the axially displaceable holding part (22) and the central drill (34) in the longitudinally running axial groove (16) for the pushing out of a core (40) that remains in the hole saw (32) after drilling.

9 Claims, 3 Drawing Sheets

(56) References Cited

U.S. PATENT DOCUMENTS

| | | | |
|---|---|---|---|
| 3,825,362 A | | 7/1974 | Hougen |
| 4,385,853 A | * | 5/1983 | Strange ............... B23B 51/0453 408/200 |
| 5,690,452 A | | 11/1997 | Baublits |
| 10,150,169 B2 | * | 12/2018 | Boske ................. B23B 51/0473 |
| 2007/0071565 A1 | * | 3/2007 | Singh ................. B23B 51/0426 408/204 |
| 2007/0160434 A1 | | 7/2007 | Gillissen |

FOREIGN PATENT DOCUMENTS

| | | | | |
|---|---|---|---|---|
| GB | 558035 A | | 12/1943 | |
| JP | 05318216 A | * | 12/1993 | |
| WO | WO-9902292 A1 | * | 1/1999 | ......... B23B 51/0453 |

\* cited by examiner

HOLE SAW ADAPTOR

FIELD OF THE INVENTION

The present invention relates to a hole saw adapter, comprising an adapter body with a first end equipped with a spindle for fastening to a drive unit, such as a drilling machine or the like, and the other end to receive a hole saw and a centre drill or the like.

BACKGROUND OF THE INVENTION

Hole saws are used to cut out a circular hole in a material and are normally formed as a cutting crown with an open cup form or half drum form that ends in a cutting edge equipped with saw teeth. The hole saw is also normally fastened to a transition or an adapter which in turn is fastened to a drilling machine or the like, possibly by being fastened to the drilling machine chuck.

After the hole has been cut, a core of the material often remains in the hole saw, which is difficult to remove. In some hole saws it is known to make a slit so that a screwdriver or the like can be pushed in so that the core is pushed out of the hole saw.

DESCRIPTION OF PRIOR ART

From the patent literature reference is made to GB 558035 A which describes a collar connected via a piston to a drill to force out the core.

Furthermore, reference is made to U.S. Pat. No. 5,690,452 A1, which relates to a hole saw where the adapter at a first end is set up to be fastened to a drive unit and at the other end it is set up to be fastened to a hole saw, and it is further set up for the fastening of a central drill.

Furthermore, a stopper is further described which is rotary connected with the hole saw and the adapter, where this stopper is also a spring.

Reference is also made to U.S. Pat. No. 3,825,362 A, EP 3181275 A1 and US 2007/160434 A1 as examples of prior art.

Bahco, which is a large supplier of tools, has developed an adapter for a hole saw, see for example https://www.youtube.com/watch?v=CEZyyzPzPE. The adapter is comprised of a longitudinal running axial groove in the form of a boring to receive the central drill, and also an ejector ring for maintaining the central drill in the axial groove. The ejector ring prevents rotation of the central drill and permits axial displacement of the central drill in the axial groove. A disadvantage with this solution is that it can be very heavy to displace the ejector ring. Another disadvantage is that a special drill must be used that fits into and is fastened to the ejector ring.

OBJECTS OF THE PRESENT INVENTION

With the present invention one aims to provide a hole saw adapter that functions as a core puller in that the drill is axially displaced with regard to the cutting crown to simplify the removal of drill cores in this way.

The tool according to the invention is a universal adapter for all types of hole saws and is particularly easy to operate and is of a simple design. This leads to low production costs. The tool can simply be equipped with a mechanical handle for completely manual operations, and/or can simply be equipped with a spring, hydraulic, compressed air or other means to drive out the core.

Consequently, it is an object of the invention to provide a solution that simplifies the removal or pushing out of a core in a hole saw.

Furthermore, standard drills can be used in the adapter according to the invention.

SUMMARY OF THE INVENTION

The above mentioned objects are achieved with a hole saw adapter comprising an adapter body with a first end equipped with a spindle for fastening to a drive unit, such as a drilling machine, and a second end to receive a hole saw and a central drill, in which the adapter body is extended and equipped with a longitudinally running axial groove where the longitudinally running axial groove is at least partially formed as a crosswise through-running and open slit in the adapter body. The central drill is realisable fastened to the inner axially displaceable holding part, said inner axially displaceable holding part can be displaced in the longitudinally running axial groove in the adapter body and is connected with an external displacement part, as the external displacement part surrounds the adapter body and is set up for enforced axial displacement of the axially displaceable holding part and the central drill in the longitudinally running axial groove for pushing out a core that remains in the hole saw after drilling.

Alternative embodiments are given in respective dependent claims.

The displacement part can be formed as a ring or casing that is set up to be displaced longitudinally along the axial groove.

Furthermore, the displacement part can comprise a partial cover that lies externally to the longitudinally running groove. The partial cover of the displacement part can be set up to function as a support for a tool, for enforced displacement of the displacement part along the longitudinally running groove.

The other end of the adapter body can comprise a threaded section or the like for fastening of the hole saw.

The other end of the adapter body can alternatively comprise a connecting piece to receive the hole saw and a displaceable locking ring or casing equipped with magnets, which keep the hole saw fixed in position. The locking ring can be equipped with a number of pegs that are set up to enter into holes at the lower bottom part of the hole saw.

The displaceable holding part can be formed as a rod with an inner boring to receive a part of the central drill and where the end surface of the holding part is set up to function as a contact surface against the core that remains in the hole saw.

The central drill can be screwed fast in the inner axially displaceable holding part. Furthermore, the displacement part can be set up to prevent rotation of the axially displaceable holding part with respect to the adapter body.

At least one part of the adapter body can be formed externally, mainly circular with one or more bevelled surfaces and the displacement part and the lock can have a mainly circular form internally with one or more bevelled faces.

In a further embodiment the displacement part and/or the locking ring can comprise one or more magnets set up to prevent axial movement of the inner axially displaceable holding part with respect to the adapter body and to permit axial movement of the inner axially displaceable holding part when a force on the central drill exceeds the magnetic force.

DESCRIPTION OF THE FIGURES

The invention shall now be described in more detail with the help of the enclosed figures, in which.

DESCRIPTION OF PREFERRED EMBODIMENTS OF THE INVENTION

Figure 1:
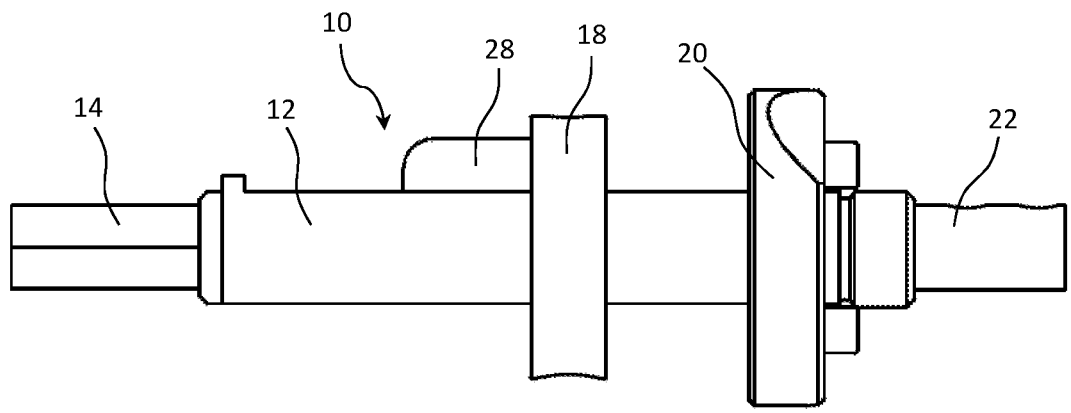
FIGS. 1 and 2 show respective side outlines of a hole saw adapter according to the invention.

The invention relates to a hole saw adapter 10 for a hole saw 32. The hole saw itself can be of any kind and as indicated earlier.

The adapter 10 comprises an adapter body 12, preferably with an extended shape and which, at a first end, is equipped with a spindle 14 for fastening to a drive appliance in a known way, for example the chuck of a drilling machine. The design allows it to be simple to adapt it to most known types such as threads, hexagonals and grooves. The other end of the adapter body 12 can correspondingly be equipped in a known way with a coupling 24 for fastening of the hole saw 32. The adapter has a universal shape which means that it can be connected directly to hole saws with, for example threads, or by the use of the different forms for quick fittings and adapters that are known on the market. For example, the hole saw 32 can be connected to a separate adapter which is then fastened to the adapter according to the invention. However, in the embodiment shown, the hole saw 32 is fastened to the adapter body 12 in a way that shall be explained later.

Figure 9:
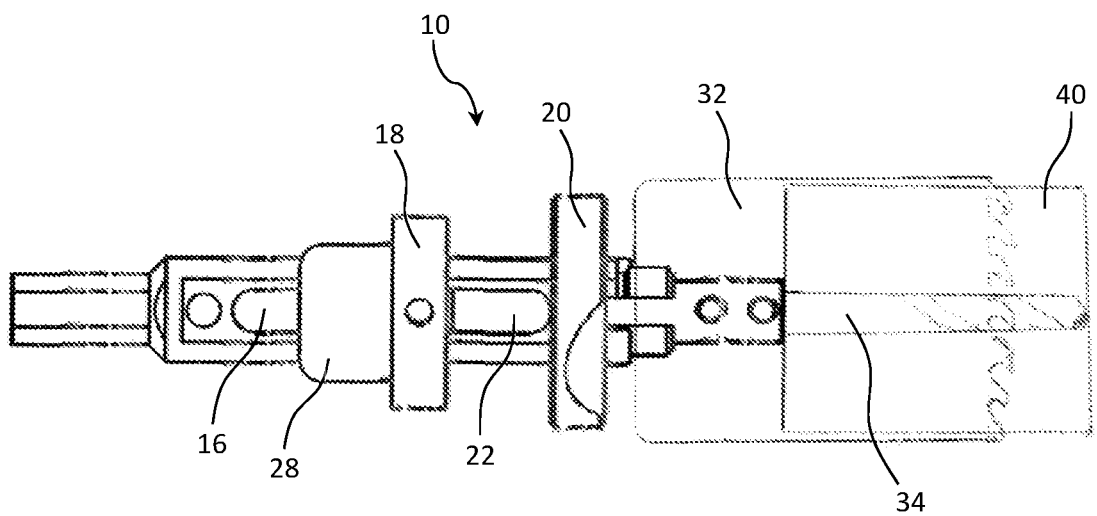
FIG. 9 shows the adapter equipped with a hole saw and central drill.

Furthermore, FIG. 9 shows that a central drill 34 extends in a known way completely or partially through the hole saw 32. Also illustrated in the figure is a core 40 that is stuck in the hole saw 32 after drilling.

One aspect of the present invention is axial displacement of the central drill 34 in the adapter body 12 and that the part to which the central drill is fastened contributes to the displacement of the core 40 from the hole saw 32.

Figure 2:
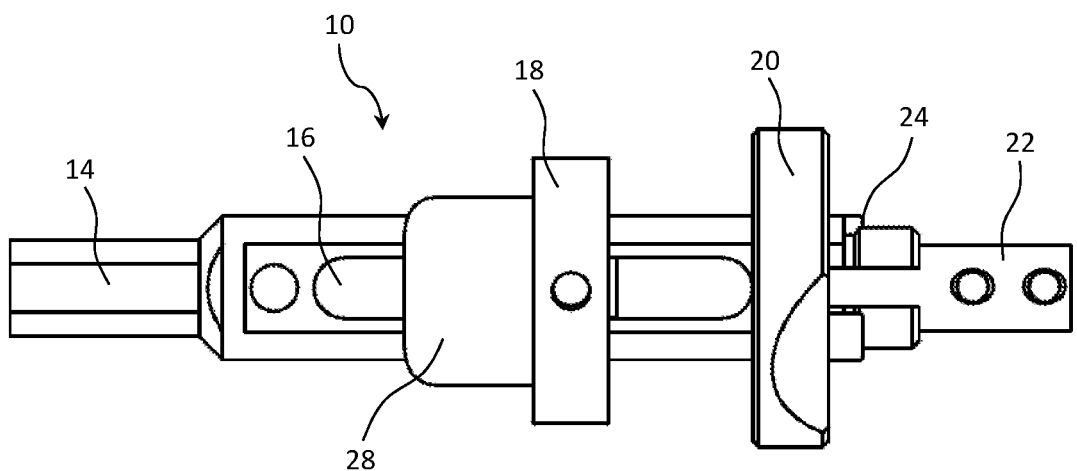
Figure 3:
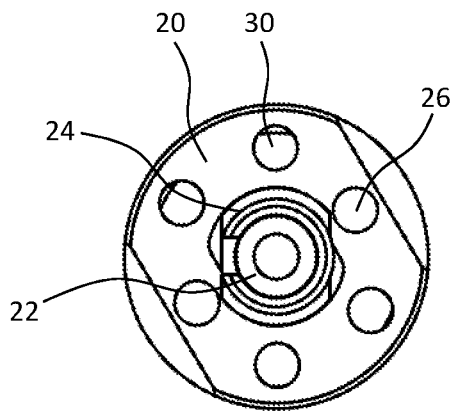
FIGS. 3 and 4 show end outlines of the adapter according to the invention.
Figure 4:
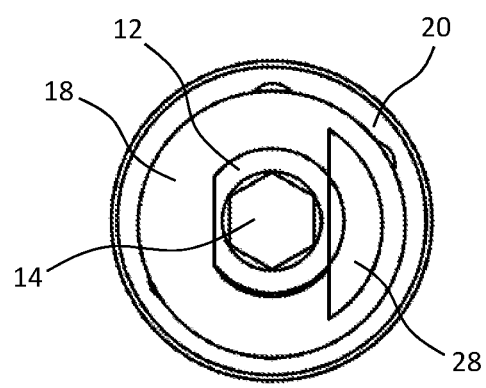
Figure 5:
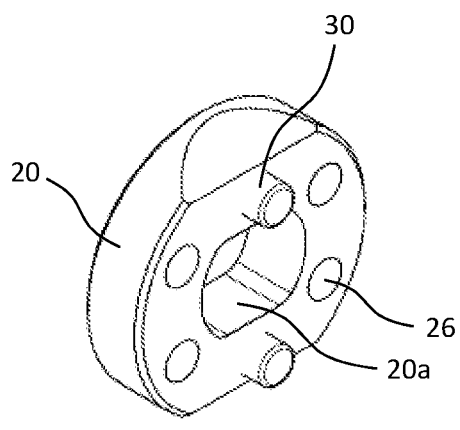
FIG. 5 shows a locking ring of the adapter according to the invention.

The adapter body 12 is consequently equipped with one or more longitudinally running axial grooves 16 or slits. These groves or the slit 16 can either run straight as shown in the figures or have another shape that provides the same advantages. In the embodiment shown is at least parts of the groove 16 formed as a through-running open slit or as an open hollow space in the adapter body 12, i.e. that the groove 16 across the adapter body 12 is completely open in the whole, or parts of, the length of the groove. As shown in FIG. 2 the groove 16 is completely open so that a tool can be completely pushed through the adapter body 12. At least the first part of the central drill 34 can thereby extend through a boring in the coupling 24 of the hole saw 32 and into the axial groove 16 in the adapter body 12 while the other part of the central drill 34 extends through the hole saw 32.

Figure 8:
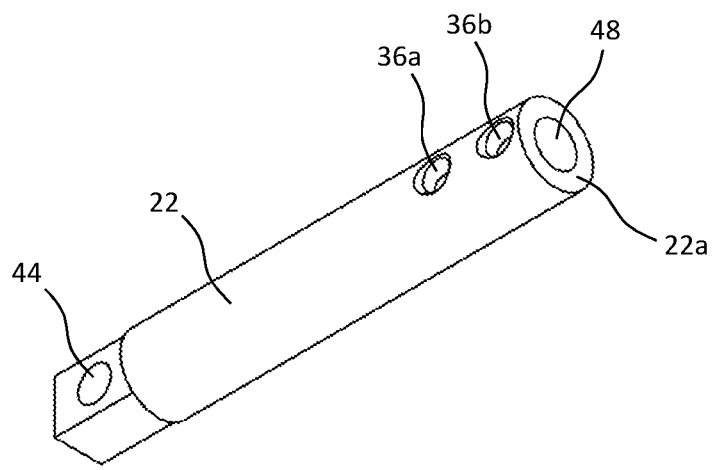
FIG. 8 shows an inner displaceable holding part of the adapter according to the invention.

Furthermore, the adapter body 12 is equipped with a mechanical unit in the form of a displacement part 18 that can be displaced in or along the axial groove 16. An inner axial displaceable holding part 22, shown in detail in FIG. 8, is arranged to be displaced in the longitudinally running groove 16 and extends out through the boring in the coupling 24 for the hole saw 32, as shown in FIGS. 1 and 2. The first or lower part of the central drill 34 is fastened in the axially displaceable holding part 22, possibly with the help of one or two screws in screw holes 36*a*,36*b*. The adapter body 12 at the other end of the coupling 24 for the hole saw 32 can have a slit 38 which allows passing of the screws.

The displacement part 18 functions as a slide and could be in the form of a ring or casing that surrounds the adapter body 12, where the displacement part 18 is connected to and fastened to the inner displaceable holding part 22, for example with the help of a screw or bolt through the fastening hole 42 in the displacement part 18 and in the fastening hole 44 in the inner displaceable holding part 22. The screw or bolt (not shown) will then extend in through the mouth opening of the longitudinally running groove 16, i.e. through the open slit. Alternatively, the displacement part 18 can have an inner neck that extends through the longitudinally running mouth opening of the groove 16 and be correspondingly fastened in the fastening hole 44 of the displaceable holding part 22.

The axial groove 16 is relatively wide with regard to the adapter body 12, such as shown, for example in FIG. 2. This leads to a wider groove, which results in less friction since the inner axially displaceable holding part 22 will then lie between "top" and "bottom" in the adapter body 12, instead of inside the adapter body. The displaceable holding part 22 can be formed as a rod and with an inner boring 48 to receive a part of the central drill 34. The end surface 22*a* of the holding part 22 can function as a contact surface against the core 40 in the hole saw 32 and thereby contribute to pushing the core 40 out of the hole saw 32. Alternatively, a stopper (not shown) can be used. The stopper can be screwed in a wanted position into the drill 34 or be threaded onto the drill and follow the drill during the drilling, for example in that the stopper screws in along the spiral groove in the central drill 34 and will in a corresponding way function as a contact surface against the core 40.

The displacement part 18 and the holding part 20 prevent rotation of the central drill 34, at the same time as the axial displacement of the central drill 34 in the adapter body 12 is permitted. By moving the central drill 34 axially after drilling with the help of the displacement part 18, the core 40 will be pushed out. The inner displaceable holding part 22 is further formed so that when the central drill 34 is fastened in it, the central drill 34 is centred in the hole saw 32.

The displacement part 18 can also comprise pegs (not shown) that extend in the axial groove 16, possibly from each side of the groove 16 that takes part in the steering of the axial movement of the displacement part 18. Alternatively, or in addition, the displacement part 18 can glide on contact points or rails on the adapter body 12. Furthermore, the displacement part 18 can function as, or be equipped with, a mechanical handle to provide the pushing out force.

Figure 6:
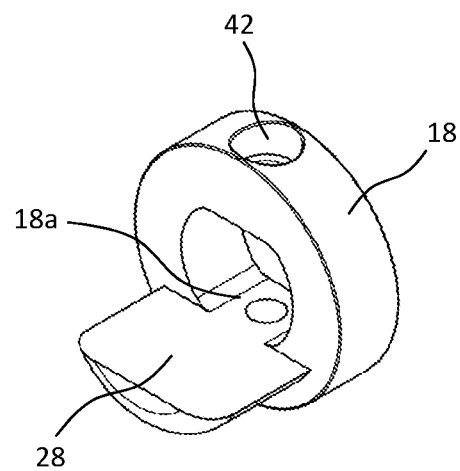
FIG. 6 shows a displacement part of the adapter according to the invention.
Figure 7:
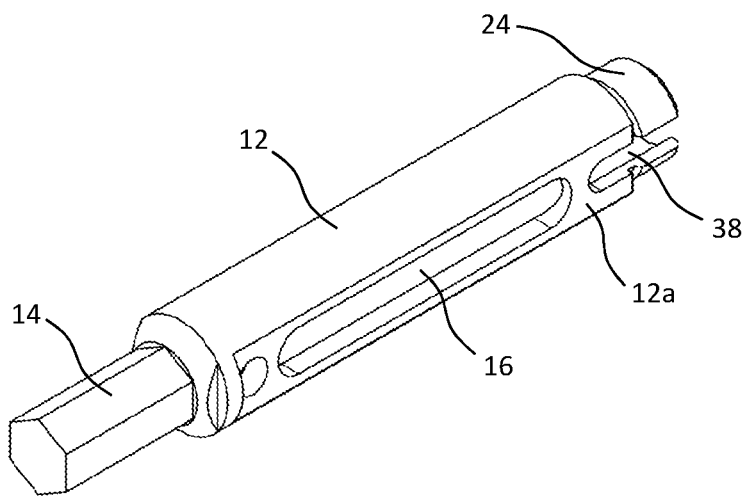
FIG. 7 shows an adapter body of the adapter according to the invention.

As shown in, for example FIG. 6 and FIG. 2, the displacement part 18 can comprise a partial cover 28, a skirt or support, which lies externally to the axial groove 16. With difficult materials, such as wet plywood, a tool in the form of for example a screwdriver can be used in the rear part of the groove 16 to provide additional force to push out the core 40 from the hole saw 32. The screwdriver can be placed in the groove 16 against the displacement part 18, possibly on the opposite side of that shown in FIG. 2, and force can be provided such that the displacement part 18 is displaced. Thereafter, the screwdriver can be put in the groove 16 and against the partial cover 28 of the displacement part 18, generally on the same side to that shown in FIG. 2, and a force can be applied so that the displacement part 18 is displaced further. Alternatively, both of the operations can be carried out from one side of the groove 16. That the groove 16 is "wide" as explained earlier means that there is ample space for the use of a crowbar or screwdriver to supply the axial movement.

If more force is required in case the core 40 is stuck in the hole saw 32, this can simply be provided by the use of a hammer, screwdriver or a larger handle. The axially displaceable displacement part 18 is constructed to be strong enough to withstand blows by, for example a hammer or a crowbar function by the use of a screwdriver.

The axial function that is achieved ensures that the core 40 can be pushed out of the hole saw 32. Due to the spiral groove of the central drill 34, the core 40 can get stuck and this may be enough to provide a force onto the core 40. Alternatively, the drill may have a rear part that is at least somewhat thicker than the point of the drill and which functions as a contact edge. It is also possible to use a step drill, a conical drill or a drill where the bore string is thicker than the drill itself.

In the embodiment shown, the hole saw 32 is fastened to the connection 24 which often has a circular groove. To hold the hole saw 32 in place a locking ring 20 is used, where the locking ring 20 is also axially displaceable on the adapter body 12. The locking ring 20 is preferably equipped with a number of magnets 26 embedded in the surface that faces the hole saw 32. Furthermore, the locking ring 20 can be equipped with a number of pegs 30 that are arranged to enter into holes in the lower part of the hole saw 32. Tests of the invention have shown that impacts and use of the hole saw do not cause any problems such as the hole saw coming loose. To simplify the decoupling of the locking ring 20 from the hole saw edge, areas on the locking ring 20 can be bevelled to form "gripping grooves or finger grooves".

To simplify and guide the displacement of the displacement part 18 and the locking ring 20, at least one part of the adapter body 12 can be formed externally, mainly circular and with one or more bevelled surfaces 12a. Correspondingly, the displacement part 18 and the locking ring 20 can be formed internally, in the main circular, and with one of more bevelled surfaces 20a,18a. This will also prevent rotation of the displacement part 18 and the locking ring 20.

As the present invention is constructed, the axially displaceable displacement part 18 can also be locked in different positions. This is a considerable advantage at, for example drilling in a tilted material, as the drill can be locked all the way out. At, for example drilling with a diamond hole saw, it is desirable to have a short drill/central holder. The invention makes it easy after the insertion of the drill, to be able to pull in the centring unit, complete the hull drilling operation, and thereafter to push out the core 40.

The central drill 34 can be locked in all positions, completely out or in, or in any position between these two extremes.

It must be said that the central drill can be used as, for example a suction cup or similar applications. After the central drill has been placed in the material the axial unit can be pulled into the adapter. Drilling with little or no drilling in the centre is now simple.

Core drilling can also be carried out without the central drill. By making the axial unit so short that it can be pulled completely up in the adapter, the adapter can be used for the pushing out operation. It is very suitable in drill press, where the axial unit can be equipped with a point to be able to find the centre of the hole drill.

In a further embodiment (not shown), the displacement part 18 and/or the locking ring 20 can be equipped with one or more magnets. The magnets can be fastened in the upper part of the displacement part 18, i.e. the side that faces the coupling 24 or the locking ring 20 if this is used, and/or when the locking ring 20 is used, it can be placed on the side of the locking ring 20 that faces the displacement part 18. The purpose of the magnets is to prevent axial movement of the inner axially displaceable holding part 22 with regard to the adapter body 12 and to permit axial movement of the inner axially displaceable holding part 22 when a force on the central drill 34 exceeds the magnetic force. This makes it possible to drill the central drill 34 in, but that it gets pushed backwards when the pressure exceeds the power of the magnets in that the axially displaceable holding part 22 is pushed in as the drill goes deeper.

The invention claimed is:

1. A hole saw adapter comprising an adapter body with a first end equipped with a spindle for fastening to a drive unit, and a second end receiving a hole saw and a central drill, in which
   the adapter body is extended and equipped with a longitudinally running axial slit,
   the central drill is releasably fastened to an inner axially displaceable holder, said inner axially displaceable holder is displaceable in the longitudinally running axial slit in the adapter body and is connected to an external displacer,
   said external displacer is a ring or a casing being displaceable longitudinally along the axial slit and which surrounds the adapter body, providing forced axial displacement of the axially displaceable holder and the central drill in the longitudinally running axial slit to push out a core remaining in the hole saw after drilling, wherein
   the longitudinally running axial slit is a cross-wise through-running open slit in the adapter body receiving a tool that can be completely pushed through the adapter body, and
   the displacer comprises a partial cover lying externally to the longitudinally running slit providing a support face for said tool giving forced displacement of the displacer along the longitudinally running slit.

2. The adapter according to claim 1, wherein the second end of the adapter body comprises a threaded section for fastening of the hole saw.

3. The adapter according to claim 1, wherein the second end of the adapter body comprises a coupling piece receiving the hole saw and a displaceable locking ring or a casing equipped with magnets for fastening of the hole saw.

4. The adapter according to claim 3, wherein the locking ring is equipped with one or more pegs entering a hole at a lower bottom part of the hole saw.

5. The adapter according to claim 1, wherein the displaceable holder is a rod with an inner boring receiving a part of the central drill and where an end surface of the holder functions as a contact surface against the core that remains in the hole saw.

6. The adapter according to claim 5, wherein the central drill is screwed into the inner axially displaceable holder.

7. The adapter according to claim 1, wherein the displacer prevents rotation of the axially displaceable holder with respect to the adapter body.

8. The adapter according to claim 1, wherein the adapter body externally is mainly circular and with one or more bevelled surfaces, and the displacer and a locking ring internally are mainly circular and with one or more bevelled surfaces.

9. The adapter according to claim 1, wherein the displacer and/or a locking ring comprise one or more magnets preventing axial movement of the inner axially displaceable holder with respect to the adapter body and to permit axial movement of the inner axially displaceable holder when a force on the central drill exceeds the magnetic force.

* * * * *